United States Patent
You et al.

(10) Patent No.: US 7,435,349 B2
(45) Date of Patent: *Oct. 14, 2008

(54) SYSTEM FOR TREATING WASTEWATER CONTAINING ORGANIC COMPOUNDS

(75) Inventors: Huey-Song You, Yilan County (TW); Ming-Jing Perage, Hsinchu (TW); Sheng-Shin Chang, Miaoli County (TW); Yih-Chang Chen, Hsinchu (TW); Shwu-Huey Perng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 282 days.

This patent is subject to a terminal disclaimer.

(21) Appl. No.: 11/374,128

(22) Filed: Mar. 14, 2006

(65) Prior Publication Data
US 2006/0243661 A1 Nov. 2, 2006

Related U.S. Application Data

(63) Continuation-in-part of application No. 10/809,358, filed on Mar. 26, 2004, now Pat. No. 7,087,170.

(30) Foreign Application Priority Data
Nov. 21, 2003 (TW) ............... 92132719 A

(51) Int. Cl.
*C02F 3/30* (2006.01)
(52) U.S. Cl. ............... 210/605; 210/615; 210/631; 210/903
(58) Field of Classification Search ............... 210/603, 210/605, 615, 631, 252, 259, 903, 906
See application file for complete search history.

(56) References Cited

U.S. PATENT DOCUMENTS

| 4,297,216 | A | * | 10/1981 | Ishida et al. ............... 210/613 |
| 4,832,847 | A | * | 5/1989 | Fujii et al. ............... 210/616 |
| 4,845,034 | A | * | 7/1989 | Menger et al. ............... 435/167 |
| 5,389,258 | A | * | 2/1995 | Smis et al. ............... 210/603 |
| 6,517,723 | B1 | * | 2/2003 | Daigger et al. ............... 210/605 |
| 6,863,817 | B2 | * | 3/2005 | Liu et al. ............... 210/605 |
| 2004/0094475 | A1 | * | 5/2004 | Hough et al. ............... 210/605 |

FOREIGN PATENT DOCUMENTS

| CN | 1199712 A | | 11/1998 |
| EP | 00997442 | | 8/2000 |
| JP | 63-214395 | * | 9/1988 |
| JP | 1999-156391 A | | 6/1999 |
| KR | 1998-25268 A | | 4/1998 |
| KR | 2003-74012 A | | 3/2002 |
| TW | 293810 | | 12/1996 |
| TW | 377340 | | 12/1999 |
| WO | WO 88/04282 | * | 6/1988 |

* cited by examiner

*Primary Examiner*—Fred Prince
(74) *Attorney, Agent, or Firm*—Bacon & Thomas PLLC

(57) ABSTRACT

A system for treating wastewater containing organic compounds is provided, comprising an anaerobic bioreactor, an aerobic bioreactor disposed rearwardly of the anaerobic bioreactor, and a membrane separation reactor disposed rearwardly of the aerobic bioreactor. The system is capable of removing organic pollutants in wastewater through biological treatment process and separating solid from the liquid ones by using a membrane. By employing the system for treating wastewater containing organic pollutants, organic pollutants can be effectively eliminated and the problem of scaling and fouling on the surface of the membrane prevented, thus achieving the objectives of lowering cost and improving efficiency.

14 Claims, 4 Drawing Sheets

---

Feeding organic containing wastewater into anaerobic bioreactor to let anaerobes therein decompose organic pollutants in wastewater;

Feeding effluent of anaerobic bioreactor into aerobic bioreactor where aerobes therein decompose residual organic in wastewater and carbon dioxide dissolved in water is stripped by air stripping effect that increases the pH value of water, whereby the crystals of metal carbonate, struvite and inorganic solids are produced and inserted in the floc matrix of aerobes through bioflocculation.

Feeding effluent of aerobic bioreactor into membrane separation reactor where solids in waster are separated to obtain effluent free of organic pollutants.

| Feeding organic containing wastewater into anaerobic bioreactor to let anaerobes therein decompose organic pollutants in wastewater; |

| Feeding effluent of anaerobic bioreactor into aerobic bioreactor where aerobes therein decompose residual organic in wastewater and carbon dioxide dissolved in water is stripped by air stripping effect that increases the pH value of water, whereby the crystals of metal carbonate, struvite and inorganic solids are produced and inserted in the floc matrix of aerobes through bioflocculation. |

| Feeding effluent of aerobic bioreactor into membrane separation reactor where solids in waster are separated to obtain effluent free of organic pollutants. |

FIG. 2

SYSTEM FOR TREATING WASTEWATER CONTAINING ORGANIC COMPOUNDS

CROSS REFERENCES TO THE RELATED APPLICATIONS

This is a Continuation-in-part of U.S. application Ser. No. 10/809,358, filed Mar. 26, 2004, now issued as U.S. Pat. No. 7,087,170 B2 on Aug. 8, 2006.

BACKGROUND OF THE INVENTION

1. Field of the Invention

The present invention relates to a system for treating wastewater containing organic compounds. The present invention combines the advantages of anaerobic and aerobic systems for disposing organic pollutants in the wastewater, and integrates both systems with the membrane separation system to increase system efficiency and lower the costs of system installation.

2. Description of Related Art

Membrane biological treatment system is one the most popular technologies used in wastewater treatment in recent years. Such system employs membrane as separation medium, in which wastewater is first decomposed by microbes and then passed through a membrane by of the driving force of vacuum pressure difference to separate solids from liquids. The resulting permeate that passes through the membrane is the treated water, while sludge and other solid matters are entrapped in the membrane separation reactor and discharged. Reverse washing or chemical cleaning is employed to remove pollutants deposited on the surface of the membrane to prolong the membrane working life.

Membrane filtration is a key element of the membrane biological treatment system. Microfiltration may be generally classified into dead-end filtration and cross-flow filtration. Dead-end filtration is similar to the conventional cake filtration where the flow of the suspension is perpendicular to the membrane surface, while solid substances are intercepted on the membrane surface and form filter cake. The thickness of filter cake is increased with the filtration volume of suspension. The flow of permeates through the membrane decreases as the filter cake thickens, which relies on the working of reverse washing cycle for cake removal from the system. In the case of cross-flow filtration, the suspension flow is parallel to the membrane surface where the cross-flow rate of suspension produces shear stress to eliminate the formation of filter cake. When the cumulative effect of the filter cake reaches equilibrium with the elimination effect, the filter cake would have constant thickness. In cross-flow filtration, there must be a rate component parallel to the membrane surface. The movement of the membrane itself or the disturbance of air bubbles can obtain such effect. For the purpose of preventing fouling so as to generate maximum permeation throughput, membrane biological treatment system typically adopts cross-flow filtration for solid-liquid separation.

In considering whether the membrane biological treatment system is economically feasible, the removal of fouling or scaling on membrane surface to prolong membrane life and lower energy loss is a key factor. Fouling refers to solid matters such as sludge, ultra fine colloid particles, and organic matters adsorbed to or settled on membrane that adds to the permeation resistance. The causes of fouling involve physical and chemical mechanisms as well as the phenomenon of concentration polarization. Scaling refers to the formation of metal crystals such as oxides, carbonates and phosphates from metals or heavy metals. For example, in the process of anaerobic reaction, the concentration of carbonate in water increases, and if Ca, Mg, Fe or other heavy metals are present in the water, the scaling of metal carbonate on membrane surface would obstruct the membrane. Serious fouling or scaling on membrane would greatly reduce the treatment throughput. Thus it is necessary to remove scaling periodically in the process of the treatment system.

In comparison with conventional activated sludge process, membrane biological treatment system requires relatively less space, and is easy to operate and maintain. The sludge entrapped in the system may be held for a long time to facilitate the removal of special or not readily biodegradable pollutants and the biological sludge can be intercepted completely. Moreover, the system does not require a settler unit, thereby saving space and increasing treatment efficiency. It is also capable of entrapping polymers that are difficult to break down. Therefore, the membrane biological treatment system is particularly suitable for small and medium scale treatment of special pollutants.

Due to the advances in membrane production technology in recent years, the membrane usage life is extended, and the loading level of membrane treatment system has increased from laboratory application level to plant applications level with capacity of 10,000 $m^3/d$. The main membrane biological treatment system used Currently is aerobic membrane biological treatment system. But the installation cost of aerobic membrane treatment system has been persistently high due to the high cost of membrane.

Several prior arts disclosed a system for treating wastewater, such as U.S. Pat. No. 6,517,723 and JP Patent Application No. 2001-58197. These two prior art also disclosed a wastewater treatment system, includes anaerobic bioreactor and membrane. However, the systems still have several drawbacks that could be resolved by this invention. Accordingly, this invention combines both aerobes and anaerobes in the membrane biological treatment system to address the problems aforesaid.

SUMMARY OF THE INVENTION

To address the drawbacks of known membrane biological treatment systems, the present invention provides a system for treating wastewater containing organic compounds, comprising:

an anaerobic bioreactor capable of removing organic pollutants in wastewater through anaerobic treatment process, and said bioreactor containing methanogens;

an aerobic bioreactor disposed rearwardly of said anaerobic bioreactor and capable of removing residual organic pollutants in the effluent of said anaerobic bioreactor through aerobic treatment process; and a membrane separation reactor disposed rearwardly of said aerobic bioreactor and capable of separating solids from liquids in the effluent of said aerobic reactor.

In one embodiment, the aforesaid anaerobic bioreactor and aerobic bioreactor are both initially seeded with anaerobic sludge. The aforesaid aerobic bioreactor and membrane separation reactor can further comprise a device for recycling microbes from said aerobic bioreactor or membrane separation reactor to said anaerobic bioreactor so that the microbe concentration of said anaerobic bioreactor can be maintained. The aforesaid anaerobic bioreactor comprises anaerobes or facultative bacteria, preferably comprising both methaogens and facultative bacteria. The aforesaid anaerobic bioreactor comprises a device for discharging sludge outside the bioreactor.

In another embodiment, the aforesaid anaerobic bioreactor and aerobic reactor are initially seeded with anaerobic sludge and aerobic sludge respectively. The aforesaid membrane separation reactor can further comprise a device for recycling microbes from said membrane separation reactor to said aerobic bioreactor. The aforesaid aerobic bioreactor and the membrane separation reactor can further comprise a device for discharging excessive aerobic waste sludge into said anaerobic bioreactor and proceeding the reaction of anaerobic digestion. The aforesaid anaerobic bioreactor comprises a device for discharging sludge outside the anaerobic bioreactor. The waste aerobic sludge in said aerobic bioreactor and membrane separation reactor can further pass through an alkaline sludge hydrolysis apparatus before being discharged into the anaerobic bioreactor.

The aforesaid aerobic bioreactor can be further used as a stripper by shortening the hydraulic retention time. During the aeration, the carbon dioxide dissolved in water is stripped, resulting in an increase of pH value in water, whereby the crystals of metal carbonate (e.g. $CaCO_3$, $FeCO_3$), struvite ($MgNH_4PO_4 \cdot 6H_2O$) and inorganic solids (e.g. FeS) are produced, and furthermore, such crystals or solids are inserted in the floc matrix of aerobes through bioflocculation, that the tendency of scaling on the membrane of said membrane separation reactor is decreased.

The aforesaid system for treating wastewater containing organic compounds can further comprise an aerobic pretreatment device arranged upstream of anaerobic bioreactor for removing toxic organic substances in the wastewater so as to reduce the inhibition of such toxic substances against anaerobes.

The aforesaid anaerobic bioreactor can further comprise denitrifying microbes.

The aforesaid membrane separation reactor can further include a gas sparging device for scouring membrane, wherein the gas is biogas or air. Scouring said membrane of membrane separation reactor with biogas could lower the pH value of water by 0.2-1.0 unit as compared to the aerobic bioreactor, hence preventing the scaling of said membranes. Alternatively, Scouring with air or air plus inorganic acid (e.g. HCl) results in the same effect as that caused by biogas.

The membrane of membrane separation reactor can be scoured with biogas or air continuously to clean the fouling on said membrane.

In one embodiment of the present invention, the aforesaid anaerobic bioreactor is a closed reactor and is a sludge-bed style. Moreover, the fluent in the aforesaid anaerobic bioreactor is non-complex mixing.

The anaerobic treatment technique features high volume efficiency without installing an oxygen supply system. It reduces the cost of installation and provides the advantage of producing less sludge than that produced by the aerobic system. The present invention combines the advantages of anaerobic and aerobic systems for disposing organic pollutants in the wastewater, and integrates both systems with one set of membrane separation system which microbes recycle to the anaerobic bioreactor to form a microorganism continuous recycling system that increase system efficiency and lower the cost. Such system may be applied in the disposal of municipal and industrial wastewater.

BRIEF DESCRIPTION OF THE DRAWINGS

FIG. 2 shows the flow diagram of the method for treating wastewater containing organic compounds according to the present invention.

DETAILED DESCRIPTION OF THE INVENTION

In environmental engineering, anaerobic microbes include methanogens generating methane, phosphate accumulating organism which release phosphate and uptake phosphate during metabolic process and generally be used in eliminating nitrogen/phosphate bio-treating system, and denitrifying microorganism which treating $NO_3$—N in water. One of the significant characteristics in the present invention is applying methanogens to anaerobic bioreactor, different from applying phosphate accumulating organism or denitrifying microorganism in traditional waste water processing system. Moreover, methylation anaerobic reactors need higher technology then traditional anaerobic reactors.

Figure 1:
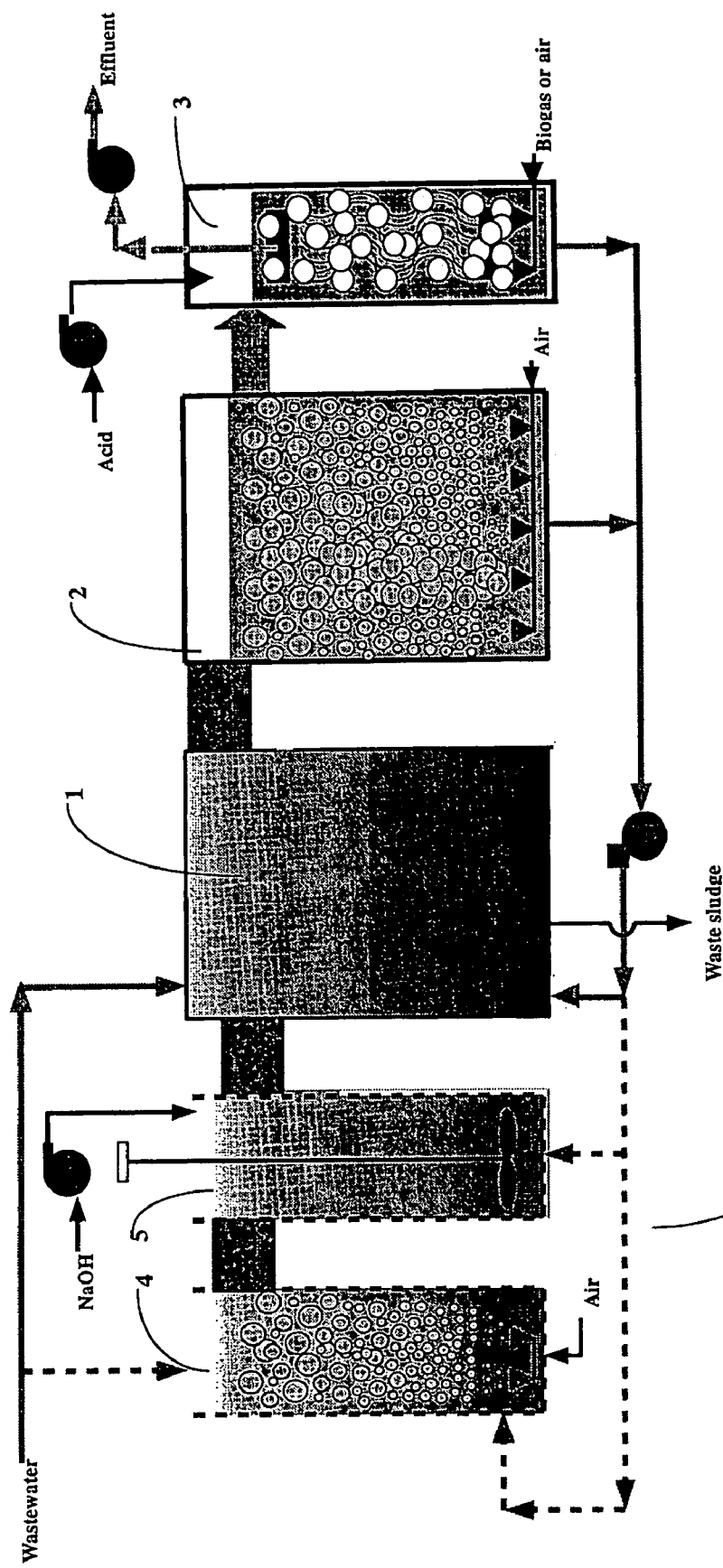
FIG. 1 shows the schematic diagram of a system for treating wastewater containing organic compounds according to the present invention.

The system for treating wastewater containing organic compounds 10 of the present invention, as shown in FIG. 1, comprises: an anaerobic bioreactor 1, which is capable of removing organic pollutants in wastewater through anaerobic treatment process of methanogens; an aerobic bioreactor 2 disposed rearwardly of said anaerobic bioreactor 1 and capable of removing residual organic pollutants in the effluent of said anaerobic bioreactor 1 through aerobic treatment process; and a membrane separation reactor 3 disposed rearwardly of aerobic bioreactor 2 and capable of separating solids from liquids in the effluent of aerobic bioreactor 2.

In one embodiment of the system 10, said anaerobic bioreactor 1 and aerobic bioreactor 2 are both initially seeded with anaerobic sludge to form a sludge bed, wherein said anaerobic bioreactor 1 contains methanogens, preferably contains both methanogens and facultative bacteria, and said aerobic bioreactor 2 contains facultative bacteria. In this embodiment, said aerobic bioreactor 2 and membrane separation reactor 3 can further comprise a device for recycling microbes from said aerobic bioreactor 2 or membrane separation reactor 3 to said anaerobic bioreactor 1 such that the microbe concentration of said anaerobic bioreactor 1 can be maintained.

In another embodiment of the system 10, wherein said anaerobic bioreactor 1 and aerobic bioreactor 2 are initially seeded with anaerobic sludge and aerobic sludge respectively; said membrane separation reactor 3 comprise a device for recycling microbes from said membrane separation reactor 3 to said aerobic bioreactor 2. Furthermore, said aerobic bioreactor 2 and membrane separation reactor 3 can further comprise a device for discharging excessive aerobic waste sludge into anaerobic bioreactor 1 and proceeding the reaction of anaerobic digestion; said aerobic waste sludge can further pass through an alkaline sludge hydrolysis apparatus 5 before being discharged into the anaerobic bioreactor 1. Otherwise, said anaerobic bioreactor 1 can further comprises a device for discharging sludge outside the anaerobic bioreactor.

In the system for treating wastewater containing organic compounds 10 provided herein, the microbes of said anaerobic bioreactor 1 and aerobic bioreactor 2 can further comprise denitrifying microbes. If necessary, an aerobic pretreatment device 4 can be further arranged upstream of anaerobic bioreactor 1 for removing toxic organic substances in wastewater; membrane separation reactor 3 can further comprise a gas sparging device for scouring membrane.

Carbon dioxide is a major by-product of anaerobe metabolism and leads to increase the carbonate concentration of water. When Ca, Mg, Fe or other metal ions existing, scaling of metal carbonate is prone to form on membrane surface, causing the membrane obstruction. In the system of present invention, the effluent of anaerobic bioreactor 1 flows into aerobic bioreactor 2 where the residual organic pollutants of said effluent would be eliminated by aerobes therein, and the dissolved inorganic ions of said effluent produce crystals or inorganic solids under high pH value in the aerobic bioreactor 2. The air stripping that may increase 1-2 unit of pH value after aeration causes the high pH value of the aerobic bioreactor 2. Furthermore, such crystals or solids are inserted in the floc matrix of aerobes through bioflocculation, decreasing the formation possibility of scaling on the membrane of said membrane separation reactor 3. When the effluent of aerobic bioreactor 2 flows into membrane separation reactor 3, the membrane would be scoured with biogas. Scouring with biogas can lower the pH value of water by 0.2-1.0 units and further prevent the formation of scaling on the membrane surface. If necessary, membrane can be scoured with air and work together with inorganic acid (e.g. HCl) to reduce the pH value of membrane separation reactor 3 or membrane can be scoured optionally with air only, those are for the purpose of preventing scaling.

FIG. 2 is the flow chart of the method for treating wastewater containing organic compounds, which comprises the following steps: (a) to begin with, feeding wastewater containing organic pollutants into an anaerobic bioreactor where the anaerobes therein decompose said organic pollutants and produce methane and carbon dioxide; (b) subsequently, feeding effluent of anaerobic bioreactor in step (a) into an aerobic bioreactor, where the aerobes therein decompose the residual organic in wastewater and carbon dioxide dissolved in water is stripped by air stripping effect that increases the pH value of water, whereby the crystals of metal carbonate, struvite and inorganic solids are produced and inserted in the floc matrix of aerobes through bioflocculation; and (c) feeding effluent of aerobic bioreactor in step (b) into a membrane separation reactor where solids in the water are separated from liquids to acquire effluents free of organic pollutants.

The aforesaid method for treating wastewater containing organic compounds can further include a denitrification procedure in step (a), and/or include a step of pretreating wastewater for removing the toxic substances (e.g. phenols and aldehydes) before step (a). Said method can also comprise a step of alkaline hydrolysis for aerobic waste sludge in an alkaline sludge hydrolysis apparatus before step (a), enhancing the hydrolysis of aerobic wastewater and the digestion capability of anaerobic sludge. Furthermore, said method can comprise a step of recycling microbes from the aerobic bioreactor and membrane separation reactor to the anaerobic bioreactor so that the concentration of microbes can be controlled within a stable range and the costs could be reduced. Otherwise, said method can further comprise a step of scouring membrane of said membrane separation reactor by biogas sparing or scouring membrane with either air or air plus inorganic acid, lowering the pH value of said membrane separation reactor and preventing the scaling formation on the membrane surface.

The advantages of the present invention are further depicted with the illustration of an example, but the descriptions made in the example should not be construed as a limitation on the actual application of the present invention.

EXAMPLE

The system used in the present example comprises an anaerobic bioreactor 1, aerobic bioreactor 2 and a membrane separation reactor 3 as shown in FIG. 1. The working volume of anaerobic bioreactor is 54 L; that of aerobic bioreactor is 16 L and that of membrane separation reactor is 6 L. The anaerobic granule sludge from a food UASB reactor is crushed with blender and then used as seed sludge. Both anaerobic bioreactor and aerobic bioreactor are initially seeded with that sludge. Microbes that can decompose organic substances in the aerobic bioreactor are facultative bacteria. Membrane used in the system is submerged ultrafiltration and gas used for aeration is biogas. The system is equipped with three peristaltic pumps for pumping untreated water, recycling sludge of aerobic bioreactor and membrane separation reactor, and effluent of membrane separation reactor respectively. The recirculation ratio of the system is 3.

Glucose and sodium acetate are used as artificial substrate for testing. The system is operated in continuous mode and the pH value and oxidation reduction potential (ORP) in anaerobic bioreactor as well as dissolved oxygen (DO), pH value and ORP in aerobic bioreactor are detected.

Figure 3:
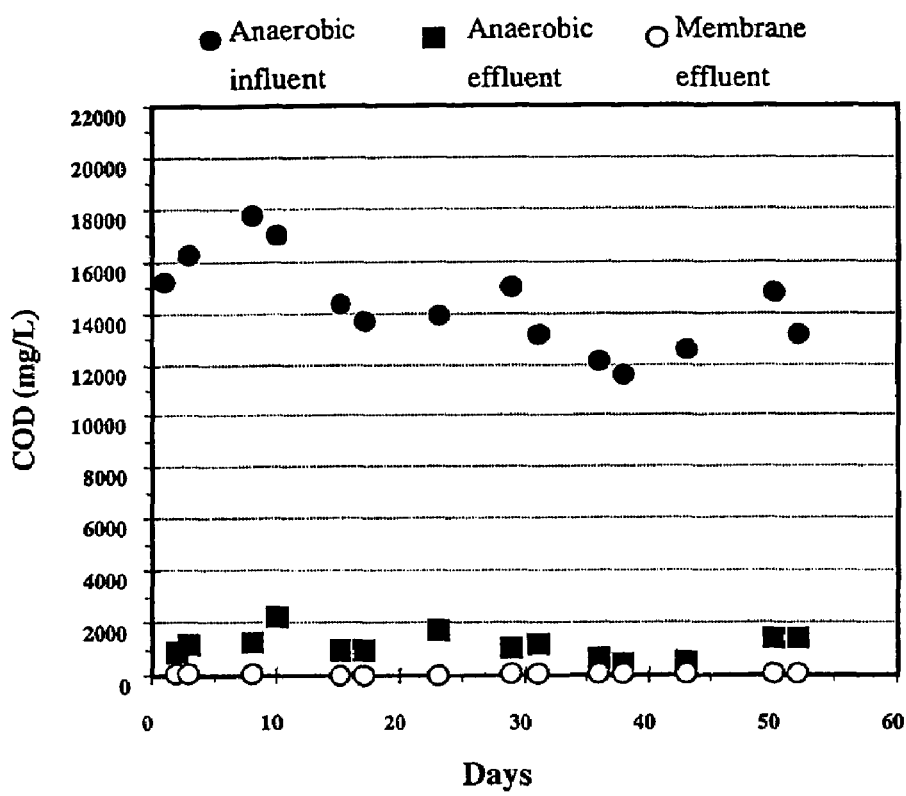
FIG. 3 shows the chart of COD concentrations of influent of anaerobic bioreactor, effluent of anaerobic bioreactor and effluent of membrane separation reactor versus days of operation.

During two months of preliminary testing, the chemical oxygen demand (COD) of anaerobic bioreactor ranges between 12,000~18,000 mg/L and influent volume is 8.6 L/day. The testing results are shown in FIG. 3. FIG. 3 shows the relationship between COD concentration and operation days in the influent of anaerobic bioreactor, effluent of anaerobic bioreactor and effluent of membrane separation reactor. The COD concentration of anaerobic effluent ranges between 1,000~2,100 mg/L, while that of membrane separation reactor effluent, the membrane permeate, ranges between 50~70 mg/L. Such results illustrated that the system for treating wastewater containing organic compounds of the present invention works effectively, in which the organic pollutants in the wastewater are decomposed by the anaerobes and aerobes and the system has maintained its disposal capability for organic pollutants even after working for two months.

Figure 4:
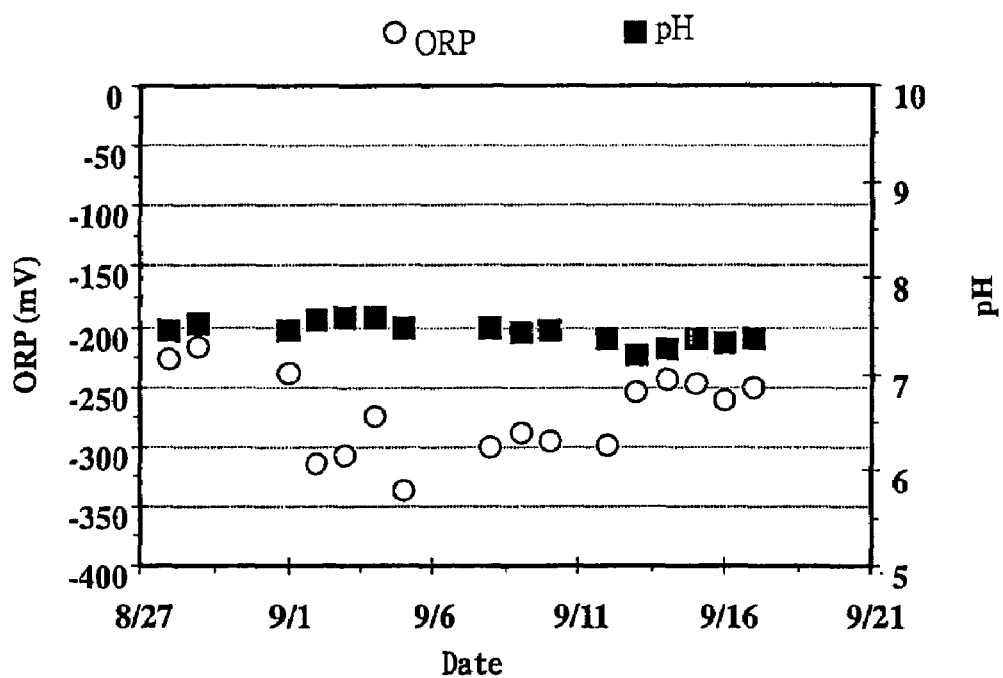
FIG. 4 shows the chart of pH and ORP in anaerobic bioreactor versus days of operation.
Figure 5:
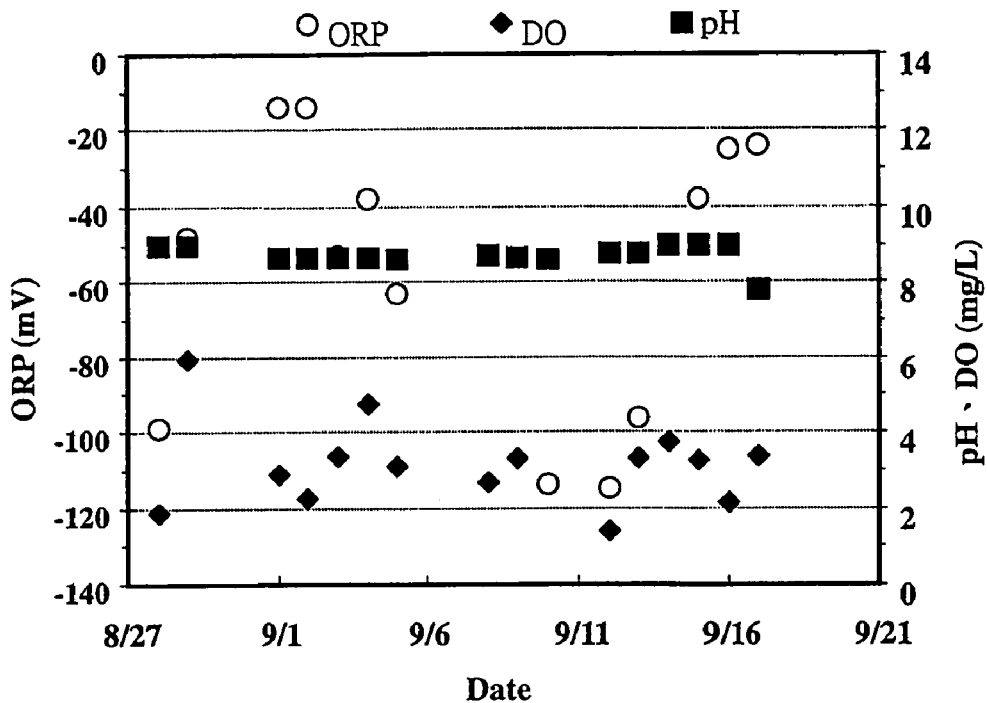
FIG. 5 shows the chart of pH, ORP and DO in aerobic bioreactor versus days of operation.
Figure 6:
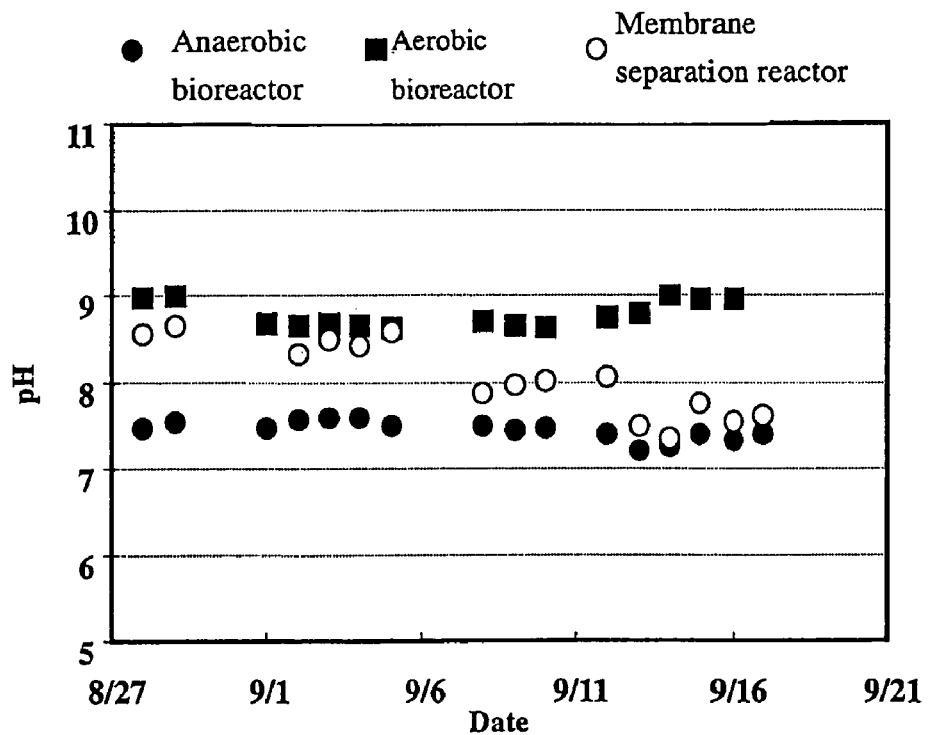
FIG. 6 shows the chart of pH in anaerobic bioreactor, aerobic bioreactor and membrane separation reactor versus days of operation.

To identify the environmental conditions of anaerobic bioreactor and aerobic bioreactor, the pH and ORP value of anaerobic bioreactor effluent, pH, DO and ORP in aerobic bioreactor, and pH value in membrane separation reactor were recorded regularly. Those results are shown in FIG. 4, FIG. 5 and FIG. 6. FIG. 4 is the monitoring results of pH and ORP in anaerobic bioreactor; FIG. 5 shows the monitoring results of pH, ORP and DO in aerobic bioreactor; and FIG. 6 is the comparison between anaerobic bioreactor, aerobic bioreactor and membrane separation reactor for the pH value. As shown in FIG. 4, the pH in anaerobic bioreactor was stable and maintained between 7.3 and 7.6; ORP was maintained between −220~−320 mV. Though there was fluctuation in the ORP value, the environment remained absolutely anaerobic condition. As shown in FIG. 5, DO in aerobic bioreactor was controlled between 2~4 mg/L which satisfied the demand of aerobic metabolism. FIG. 5 also shows that the pH in aerobic bioreactor rose to 8.6~8.9 due to the high concentration of carbonate in effluent of anaerobic bioreactor. During aeration, air stripping increased the pH value. The elevated pH value enhanced the tendency toward crystal formation of metal ions. FIG. 5 also shows the significant fluctuation of ORP in aerobic bioreactor, the ORP ranged between −10 mV and −120 mV though DO in the water reached 2~4 mg/L, indicating that active reduction was going on in aeration reactor. This means that the system was still capable of decomposing organic pollutants even after two months of operation. FIG. 6 shows that the pH in anaerobic bioreactor was 1-2 units lower than that in aerobic bioreactor, while the pH in aerobic bioreactor was 0.1-1.5 units higher than that in membrane separation reactor.

In U.S. Pat. No. 6,517,723, Daigger et al discloses anaerobic bioreactor capable of removing organic pollutants in wastewater through anaerobic treatment process, an aerobic bioreactor disposed rearwardly of said anaerobic bioreactor and capable of removing residual organic pollutants in the effluent of the anaerobic bioreactor through aerobic treatment process; and a membrane separation reactor disposed rearwardly of the aerobic bioreactor and capable of separating solids from liquids in the effluent of said aerobic bioreactor or membrane separation reactor to said anaerobic bioreactor, wherein an sparger scour the membrane. The patent provides a wastewater treatment process for treating organic pollutants and nutrient, which contain nitrogen and phosphorous. The treatment process possess ate least two membrane reactor, one of which after anaerobic bioreactor and one of which after aerobic bioreactor. The difference between the present invention and Daigger include: (1) the present invention has one membrane separation reactor, Daigger need at least two membrane structure and consume more power; (2) the anaerobic reactor in the present invention is closed-style and sludge-bedded, however, Daigger is open-style and completely mixing; (3) the anaerobic reactor in the present invention proceeds methylation by methanolgens, however, the anaerobic reactor in Daigger carries out phosphorous releasing and denitrification reaction; (4) the present invention makes use of bioflocculation to effectively preventing scaling and fouling on the surface of the membrane, however, Daigger doesn't disclose likewise function.

In Japan Patent application no. P2001-58197A, Nakamura et al. discloses anaerobic bioreactor containing anaerobes and facultative bacteria capable of removing organic pollutants in wastewater through an anaerobic treatment process, an aerobic bioreactor containing aerobes and facultative bacteria disposed rearwardly of said anaerobic bioreactor and capable of removing residual organic pollutants in the effluent of said anaerobic bioreactor through aerobic treatment process; and a membrane separation reactor disposed rearwardly of said aerobic bioreactor, wherein said aerobic bioreactor and said membrane reactor can further comprise a device for recycling microbes from said aerobioreactor or membrane separation reactor to said anaerobic bioreactor. The main purpose of Nakamura's system is to make use of nitrification and denitrification of microbes for removing nitrogen pollutant in wastewater. There are at least four differences between the present invention and Nakamura including: (1) the wastewater treating system in the present invention has one anaerobic bioreactor, one aerobic reactor and one membrane separation reactor; Nakamura has two anaerobic bioreactors, two aerobic reactors and one set of membrane; (2) the anaerobic reactor in the present invention proceeds methylation by methanolgens, however, the anaerobic reactor in Nakamura carries out denitrification by anaerobic microbes to produce nitrogen, and the second anaerobic reactor need to add methanol or acetic acid; (3) the anaerobic reactor in the present invention is closed-style and sludge-bedded, however, Nakamura is open-style and completely mixing; (4) Nakamura is silent on bioflocculation to effectively preventing scaling and fouling on the surface of the membrane, which is a critical characteristic in the present invention.

To sum up, in the system for treating wastewater containing organic compounds provided herein, the microbes for decomposing organic pollutants used in anaerobic bioreactor are methanogens and facultative anaerobes, and those used in aerobic bioreactor are facultative anaerobes. The anaerobic reactor in the present invention doesn't need three-phase separator, which is necessary in general sludge-bedded reactors; thus the microbes in aerobic bioreactor could be circulated to anaerobic bioreactor.

In the aerobic bioreactor, the pH value of water is increased while removing organic pollutants, and inorganic crystals are inserted into the floc matrix of microbes through bioflocculation, reducing the tendency of scaling formation on membrane surface. Otherwise, the membrane is scoured with biogas or air plus inorganic acid to lower the pH value in membrane separation reactor, or scoured with air only. Those reduce the membrane scaling and achieve the purpose that prolonging the usage life of the membrane.

What is claimed is:

1. A system for treating wastewater containing organic compounds, comprising:
   an anaerobic bioreactor capable of removing organic pollutants in wastewater through anaerobic treatment process, and said bioreactor containing methanogens;
   an aerobic bioreactor disposed rearwardly of said anaerobic bioreactor and capable of removing residual organic pollutants in the effluent of said anaerobic bioreactor through aerobic treatment process;
   a membrane separation reactor disposed rearwardly of said aerobic bioreactor and capable of separating solids from liquids in the effluent of said aerobic bioreactor; and
   a gas sparging device which is comprised in said membrane separation reactor for scouring membrane;
   wherein said aerobic bioreactor is further used as a stripper to strip carbon dioxide, where the pH value of wastewater is increased and crystals or solids suspended therein are inserted in the floc matrix of aerobes through bioflocculation to prevent scaling and fouling on the surface of said membrane.

2. The system according to claim 1, wherein said anaerobic and aerobic bioreactors are both initially seeded with anaerobic sludge.

3. The system according to claim 2, wherein said aerobic bioreactor and membrane separation reactor can further comprise a device for recycling microbes from said aerobic bioreactor or membrane separation reactor to said anaerobic bioreactor.

4. The system according to claim 1, wherein said anaerobic bioreactor and aerobic bioreactor are initially seeded with anaerobic sludge and aerobic sludge respectively.

5. The system according to claim 1, wherein said anaerobic bioreactor further comprises facultative bacteria.

6. The system according to claim 1, wherein said aerobic bioreactor comprises facultative bacteria or aerobes.

7. The system according to claim 1, wherein said system further comprises a pretreatment device arranged upstream of said anaerobic bioreactor for removing toxic organic substances in the wastewater so as to reduce toxic inhibition in anaerobic bioreactor.

8. The system according to claim 1, wherein said system further comprises an alkaline sludge hydrolylsis apparatus arranged upstream of said anaerobic bioreactor to promote the hydrolysis of aerobic wastewater and enhance the digestion capability of anaerobic sludge.

9. The system according to claim 1, wherein said anaerobic bioreactor and aerobic reactor are capable of denitrification.

10. The system according to claim 1, wherein said gas is biogas or air.

11. The system according to claim 10, wherein said biogas sparging device reduces pH value of water by 0.2-1.0 unit and prevent membrane scaling.

12. The system according to claim 10, wherein using said air by an air sparging device is further added with inorganic acid to adjust the pH in water.

13. The system according to claim 1, wherein said anaerobic bioreactor is a closed reactor.

14. The system according to claim 1, wherein said anaerobic bioreactor is sludge-bed style.

* * * * *